United States Patent [19]
Capitant et al.

[11] Patent Number: 5,185,666
[45] Date of Patent: Feb. 9, 1993

[54] DIGITIZED FILM IMAGE PROCESSING SYSTEM WITH BORDERED SPLIT SCREEN DISPLAY

[75] Inventors: Patrice J. Capitant, Los Altos; Vinson R. Perry, San Carlos; David O. Hodgson, San Mateo, all of Calif.

[73] Assignee: Sony Corporation of America, Park Ridge, N.J.

[21] Appl. No.: 740,626

[22] Filed: Aug. 5, 1991

[51] Int. Cl.$^5$ .......................................... H04N 5/262
[52] U.S. Cl. ................................... 358/183; 358/76; 358/22; 358/214
[58] Field of Search ................ 358/54, 76, 80, 214, 358/216, 183, 22, 453; 355/20, 38, 45; 340/747

[56] References Cited

U.S. PATENT DOCUMENTS

| | | | |
|---|---|---|---|
| 4,360,831 | 11/1982 | Kellar | 358/182 |
| 4,603,966 | 8/1986 | Brownstein | 358/54 |
| 4,694,329 | 9/1987 | Belmares-Sarabia et al. | 358/105 |
| 4,763,186 | 8/1988 | Balmares-Sarabia et al. | 358/22 |
| 4,764,809 | 8/1988 | Haycock et al. | 358/183 |
| 4,782,384 | 11/1988 | Tucker et al. | 358/226 K |
| 4,782,390 | 11/1988 | Hayashi et al. | 358/76 |
| 4,814,885 | 3/1989 | Beard | 358/216 |
| 4,857,994 | 8/1989 | Belmares-Sarabia et al. | 358/22 |
| 4,862,251 | 8/1989 | Belmares-Sarabia et al. | 358/22 |
| 4,907,071 | 3/1990 | Belmares-Sarabia et al. | 358/22 |
| 4,935,809 | 6/1990 | Hayashi et al. | 358/76 |
| 4,992,781 | 2/1991 | Iwasaki et al. | 358/183 |
| 5,028,993 | 7/1991 | Kobori et al. | 358/76 |
| 5,040,066 | 8/1991 | Arbeiter et al. | 358/22 |
| 5,042,078 | 8/1991 | Oshikoshi et al. | 358/183 |
| 5,055,941 | 10/1991 | Suzuki et al. | 358/80 |

Primary Examiner—Edward L. Coles, Sr.
Assistant Examiner—Kim Yen Vy
Attorney, Agent, or Firm—Limbach & Limbach

[57] ABSTRACT

A method and system for generating a bordered split screen video display. In preferred embodiment, the invention generates a composite signal from digital signals representing reference and scanned film images, converts the composite signal to a composite video signal, and displays the composite video signal as a bordered split screen video display. The invention can be embodied in a film scanning system which includes a processor for digitally correcting a digital signal representing a digitized film image, such as by performing digital color correction on the digital signal. The film scanning system also includes field store circuitry for storing the corrected digital signal and a digital reference signal, circuitry for generating a composite signal from the stored reference and corrected signal, and circuitry for generating a composite video signal from the composite signal. In accordance with the invention, the composite video signal is displayed as a split screen composite image having a distinctive border between distinct test and reference picture areas. In a class of preferred embodiments, a graphics cursor signal is also inserted into the composite signal. When displayed, the cursor signal overlays a cursor region of the bordered split screen composite image.

20 Claims, 10 Drawing Sheets

DIGITIZED FILM IMAGE PROCESSING SYSTEM WITH BORDERED SPLIT SCREEN DISPLAY

FIELD OF THE INVENTION

The invention is a method and system for generating a bordered split screen display for comparing a digitized film frame with a reference frame. The system of the invention generates a composite signal from a digital signal representing a reference image and a digital signal representing a scanned film image, and generates a bordered split screen display from the composite signal.

BACKGROUND OF THE INVENTION

Conventional motion picture film comprises frames that are commonly displayed sequentially at a frame rate of 24 frames per second (24 fps), 30 fps, or some other rate. Required special effects may be embodied in the displayed film.

Systems (including "telecone" systems) have been developed for converting motion picture film into video signals. These systems generate a video signal from motion picture film images by scanning the film frames sequentially to generate digitized film images. They then convert the digitized images into a video signal having a standard video frame rate (25 video frames per second for PAL video, 29.97 fps for NTSC video, or 30 fps for SMPTE-240M high definition video). Each video frame consists of two fields.

Conventional film scanning systems typically include circuitry for performing color correction on scanned images in real time (either before or after the images are digitized). To enable a user to perform color correction in a convenient manner, some conventional systems of this type are capable of generating a composite video signal comprising complementary portions of a color corrected image and a reference image, for split screen display on a video monitor.

During color correction, the user typically defines a "test" set of color correction parameters, and the system generates a "test" color corrected signal by processing one or more scanned film images in accordance with a color correction algorithm determined by the test set of parameters. The user then typically refines the test set of parameters to cause the system to produce a color corrected signal which, when displayed as a "test" image, has a color appearance matching that of a reference image.

In such a process, a split screen display usefully permits side-by-side comparison of a reference image with the latest test image.

However, until the present invention, split screen displays of this type had limited practical benefit. Often, the user could not readily distinguish between the two picture regions of the split screen display since the displayed reference and test images often differed only slightly and subtly in visual appearance.

In some prior art analog color correction systems, the user can define a window within a single digitized film image (for example, to select a set of color parameters that are defined by the image portion within the window). One such system is described in U.S. Pat. No. 4,694,329. In the system of U.S. Pat. No. 4,694,329, a window (of the type mentioned in this paragraph) can be surrounded by a border to distinguish the window from the remaining portion of the displayed single image. However, this type of conventional color correction system does not generate a composite signal from two or more digital signals representing two or more different images (for example, reference and scanned images) and does not generate a split-screen display having a border between picture areas in which different images are displayed. Thus, this type of conventional system does not enable the user conveniently to compare a reference image and a test image, and conveniently apply reference image color correction parameters to the test image by entering appropriate commands to the system.

SUMMARY OF THE INVENTION

The invention is a system and method for generating a bordered split screen display for comparing a digitized film frame with a reference frame. In preferred embodiment, the invention includes circuitry for generating a composite signal from digital signals representing a reference image and a scanned film image, and for generating a bordered split screen display from the composite signal.

In one embodiment, the invention is a film scanning system including a processor for digitally correcting a digital signal representing a digitized film image (such as by performing digital color correction on the digital signal). The system also includes field store circuitry for storing the corrected digital signal (sometimes referred to herein as the "test" signal) and a digital reference signal representing a reference image, circuitry for generating a composite signal from the reference signal and the stored test signal, and circuitry for generating a composite video signal from the composite signal. In accordance with the invention, the composite video signal is displayed as a splits screen composite image having a distinctive border between distinct "test" and "reference" picture areas.

In a class of preferred embodiments, the invention also includes means for inserting a graphics cursor signal into the composite signal. When displayed, the cursor signal overlays a cursor region of the split screen composite image. The system is designed so that, when the displayed cursor highlights a region of a displayed composite image, a user may readily select color correction parameters to match the highlighted region by entering appropriate commands to the system.

DETAILED DESCRIPTION OF THE PREFERRED EMBODIMENT

Figure 1:
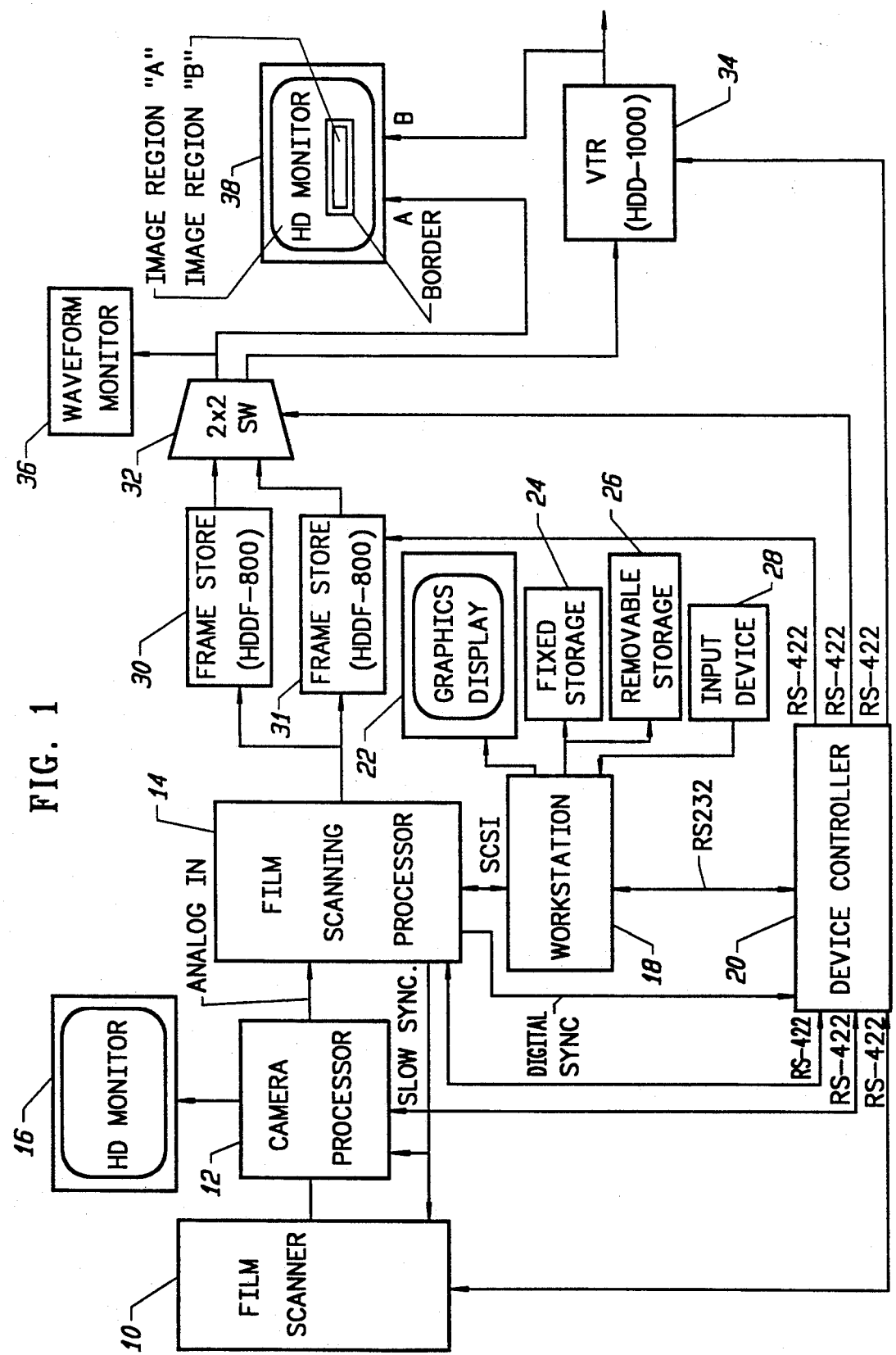
FIG. 1 is a block diagram of a film to video conversion system embodying the invention.

The apparatus of the invention can be embodied in the apparatus disclosed in each of the following patent applications, each assigned to the assignee of the present application: "Non-Real-Time Film Scanning System," by P. Capitant, D. Hodgson, and V. Perry, filed Aug. 7, 1991, (Ser. No. 07/741,329); "Method and Apparatus for Flare Correction," by D. Hodgson and Y. Levy, filed Aug. 19, 1991 (Ser. No. 07/746,928); "Digital Color Correction System and Method," by P. Capitant, et al., filed Jun. 5, 1991, (Ser. No. 07,710,704); "Digital Video Color Processor with Anti-Aliasing Filter," by D. Hodgson, filed Aug. 5, 1991, (Ser. No. 07/740,623) "Film-to-Video Frame Image Conversion Apparatus and Method for Selectively Identifying Video Fields and Frames," by P. Capitant, D. Hodgson and V. Perry, filed May 14, 1991 (Ser. No. 07/699,928); and "Digital Video Processing System with Mixer Prefilter," by D. Hodgson, filed Jul. 25, 1991, (Ser. No. 07/736,006). The specification of each listed application is incorporated herein by reference.

We contemplate that the invention may be embodied in a film scanning and processing system of the type shown in FIGS. 1-9. The system of FIG. 1 includes film scanner 10 and camera processor 12. Film scanner 10 transports motion picture film (color or black and white) past camera processor 12, which includes a video camera and related analog video signal processing circuitry. Camera processor 12 images each film frame adjacent to it, and generates an analog signal representing each film frame.

In a preferred embodiment, the motion picture film is imaged by camera processor 12 at a rate of 1.875 frames per second ("1.875 fps"), as scanner 10 transports the film past camera processor 12 at that rate (1.875 fps). Camera processor 12 preferably generates analog high definition video signals, such as analog high definition video signals having SMPTE240M format.

The analog output of camera processor 12 is supplied to film scanning processor 14, and is optionally also displayed on monitor 16. Within film scanning processor 14, the analog video signals from camera processor 12 are digitized, and various digital signal processing operations (to be discussed in detail below with reference to FIGS. 2-6) are performed digitally on the digitized video data. Color correction will typically also be performed by circuitry (to be discussed in detail below with reference to FIG. 6) within processor 14. Flare correction is also performed, preferably digitally, by circuitry within processor 14.

Computer 18 interfaces with, and controls processor 14 and device controller 20. In response to user commands sent from computer input device 28 to computer 18, computer 18 instructs processor 14 to perform signal processing operations selected by the user, and computer 18 instructs controller 20 to send user-selected control signals to processor 12, scanner 10, frame storage units 30 and 31, 2×2 switch 32, and video recording and playback unit 34.

In a preferred embodiment, computer 18 is a workstation (such as a NEWS 1850 workstation, available from Sony Corporation) connected by an SCSI interface to processor 14, computer 18 is connected by an R5232 interface to controller 20, and computer 18 is connected by an R5422 interface to processor 12, scanner 10, frame storage units 30 and 31, switch 32, and video recording and playback unit 34. In one preferred embodiment, units 30 and 31 are Model HDDF500 high definition video frame store units available from Sony Corporation, and recording and playback unit 34 is a Model HDD-1000 high definition video recorder available from Sony Corporation.

Also connected to computer 18 are fixed data storage means 24 (which may be a hard disk drive) and removable data storage means 26 (which may be a floppy disk drive), and graphics display 22 (preferably, a high resolution color graphics display).

Preferably, computer input device 28 includes a touch tablet for finger selection of menu items and icons displayed on monitor 22, a trackball for selecting color and image areas displayed on monitor 22, and a keyboard for entering text, user notes, and processing parameters.

After the digitized video data are processed digitally in processor 14, the processed data are stored on a frame-by-frame basis in frame stores 30 and 31. Switch 32, under control of controller 20, connects desired ones of frame stores 30 and 31 to video recording and playback unit 34 and to waveform monitor 36 and video monitor 38 (which is preferably a high definition video monitor) To maximize the system's throughput rate, as a frame of data is read out from one of frame stores 30 and 31, the next frame of data should simultaneously be written into the other one of frame stores 30 and 31. In such an operating mode, switch 32 connects alternating ones of frame stores 30 and 31 to unit 34 (and optionally also to monitors 36 and 38).

Figure 2:
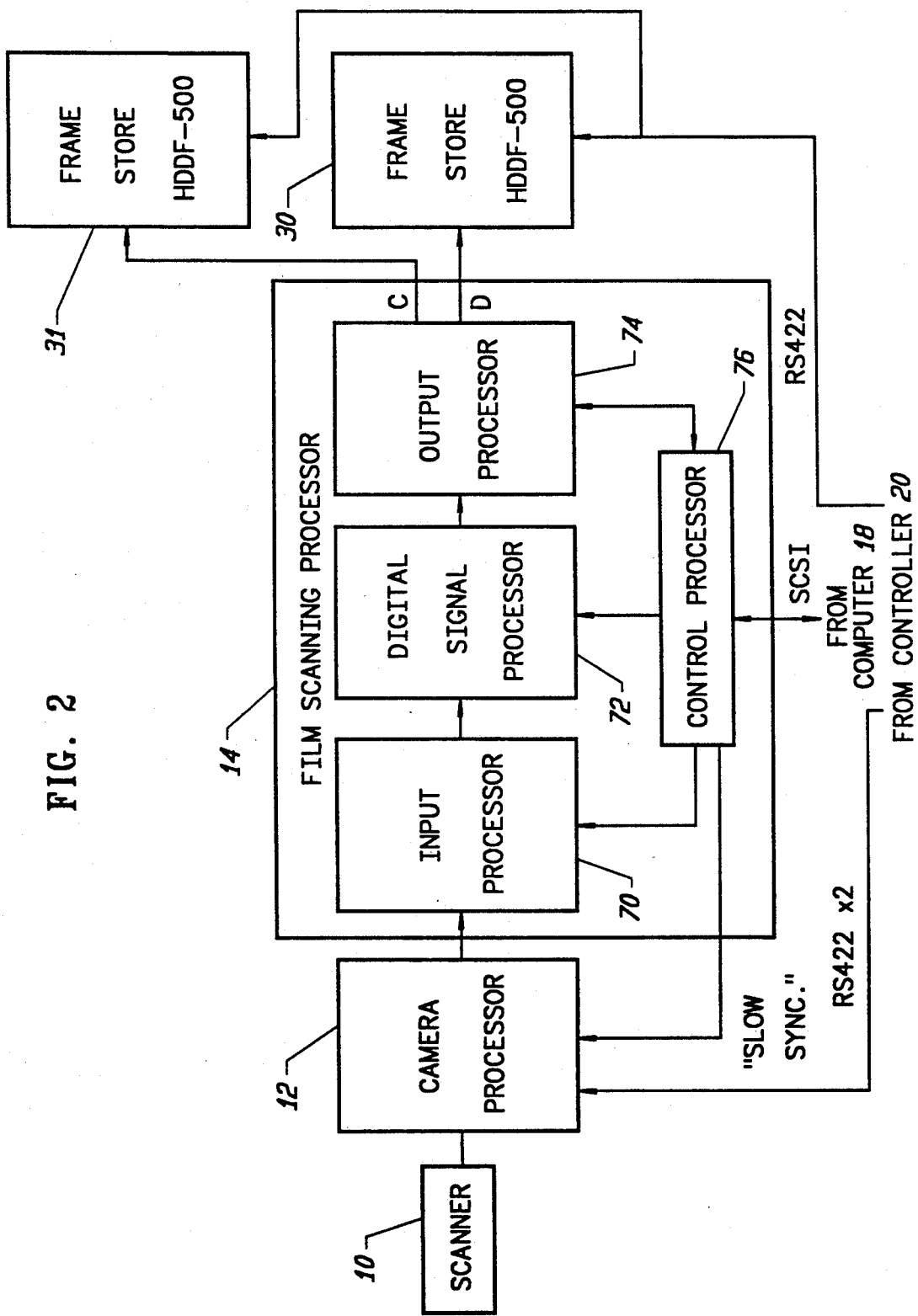
FIG. 2 is a block diagram of a portion of the FIG. 1 system.

The preferred embodiment of film scanning processor 14 shown in FIG. 2 includes input processor 70 (which receives the analog output of camera processor 70), digital signal processor 72, output processor 74, and control processor 76. Input processor 70 digitizes the analog input signal, performs preliminary corrections on the resulting digitized data, and supplies the preliminarily processed digitized data to digital signal processor 2 for color correction. The color corrected data generated in processor 72 are supplied through output processor 74 to frame stores 30 and 31. Processors 70, 72, and 74 operate under control of control processor 76, which in turn receives instructions from computer 18 over an SCSI interface.

In one class of embodiments, control processor 76 generates a synchronization signal for reading out (discharging) an image sensor means within camera processor 12. Preferably, the image sensor means is read out at a low rate (such as 1.875 fps) in response to a correspondingly low rate synchronization signal ("slow sync') from processor 76.

Figure 3:
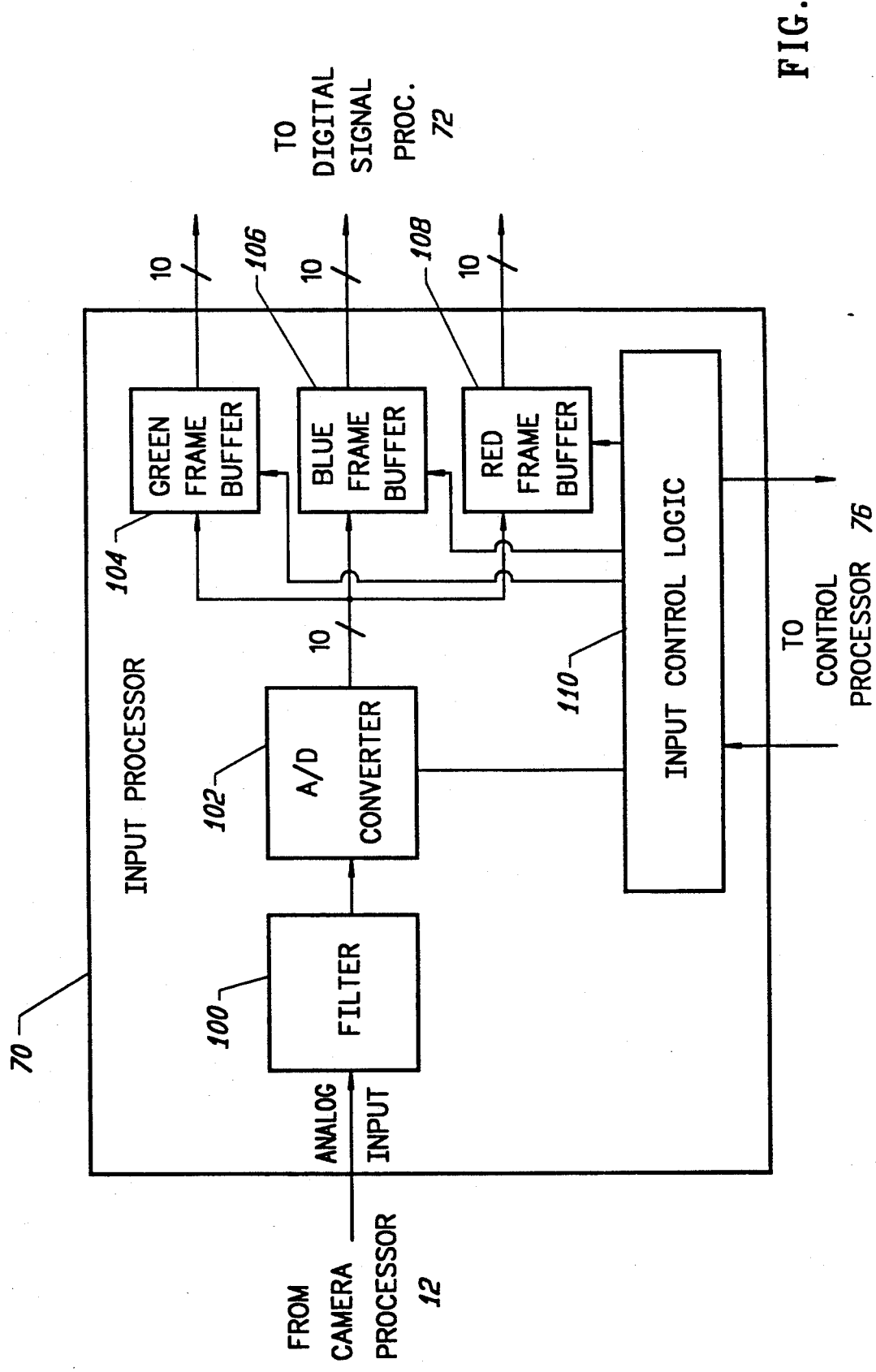
FIG. 3 is a block diagram of the input processor shown in FIG. 2.

A preferred embodiment of input processor 70 is shown in FIG. 3. The analog input signal supplied to processor 70 consists of frames, each comprising 2200×1125 pixels. There are 2200 pixels per line, including 1920 active video pixels, and 280 pixels which comprise the horizontal blanking interval. Each frame consists of 1125 lines, including lines comprising an even field and an odd field, and ninety lines comprising a vertical blanking interval. The vertical blanking intervals contain synchronization information.

The analog input signal is supplied from camera processor 12 (preferably over a 75 ohm coax cable) to filter/amplifier circuit 100. Circuit 100 includes an amplifier for amplifying the analog input signal, circuitry for separating the sync and video portions of the input signal, and a low pass filter for filtering the video portion of the input signal to enhance resolution during digitization. In one embodiment, the cutoff frequency of the low pass filter within circuit 100 is about 7.5 MHz, with the filter having a flat frequency response from 0 to 7.5 MHz, and the frequency response of the filter declining in a steep slope from 7.5 MHz to 9.3 MHz.

The amplified, low-pass-filtered analog output from filter 100 is digitized in analog-to-digital conversion circuit 102. In a preferred embodiment, circuit 102 implements 10-bit quantization, in which case the digital data generated by circuit 102 will comprise ten parallel digital data streams. In order to perform 10-bit quantization with relatively simple, inexpensive analog-to-digital conversion circuitry 102, we prefer that the output frame rate of camera processor 12 should equal 1.875 fps. When the output frame rate of camera processor 12 is 1.875 fps, the digital data emerging from circuit 102 has a data rate of 18.56 MHz (one fourth the proposed realtime SMPTE-240M high definition digital video clock rate, 74.25 MHz).

The digital video data generated by A/D converter 102 are supplied to green frame buffer 104, blue frame buffer 106, and red frame buffer 108. The output of camera processor 12 is time division multiplexed, typically in the following sequence: two fields of blue data, then two fields of green data, then two fields of red data, and finally two fields of gray data. Input control logic circuitry 110 (operating under control of control processor 76) causes frames of blue digital data ("B$_{in}$"), green digital data ("G$_{in}$"), and red digital data ("R$_{in}$") from A-to-D converter 102 to be written sequentially (on a frame-by-frame basis) into buffer 106, then into buffer 104, and next into buffer 108. The gray frames are not normally written into any of buffers 104, 106, and 108.

Blue, green, and red data are written sequentially into buffers 104, 106, and 108 at the source rate (typically, 1.875 frames per second). Blue, green, and red data are read out in parallel from buffers 104, 106, and 108 (to produce three parallel data streams, each representing a different 10-bit color channel) at four times the source rate. Thus, each color channel output from buffers 104, 106, and 108 typically has a frame rate of 7.5 frames per second (one fourth of the proposed standard SMPTE-240M digital video frame rate). In order to achieve the described four-fold increase in frame rate, each bit written into one of buffers 104, 106, and 108, is read out four times from that buffer.

Preferably, each of buffers 104, 106, and 108 is a double buffer, including a first memory, and a second memory into which data can be written while data (previously written into the first memory) is read from the first memory.

As mentioned, the gray frames are not normally written into any of buffers 104, 106, and 108. However, in one class of embodiments, the system has an optional operating mode in which gray frames are read from input processor 70 at four times the source rate at which they are supplied to processor 70. In one such embodiment, a double gray frame buffer is connected in parallel with buffers 104, 106, and 108. One memory within the double gray frame buffer is filled while the other memory therein is read (at four times the source rate) to processor 72. In another of such embodiments, the gray frames (rather than the red, green, and blue frames) are read into one or more of buffers 104, 106, and 108.

Figure 4:
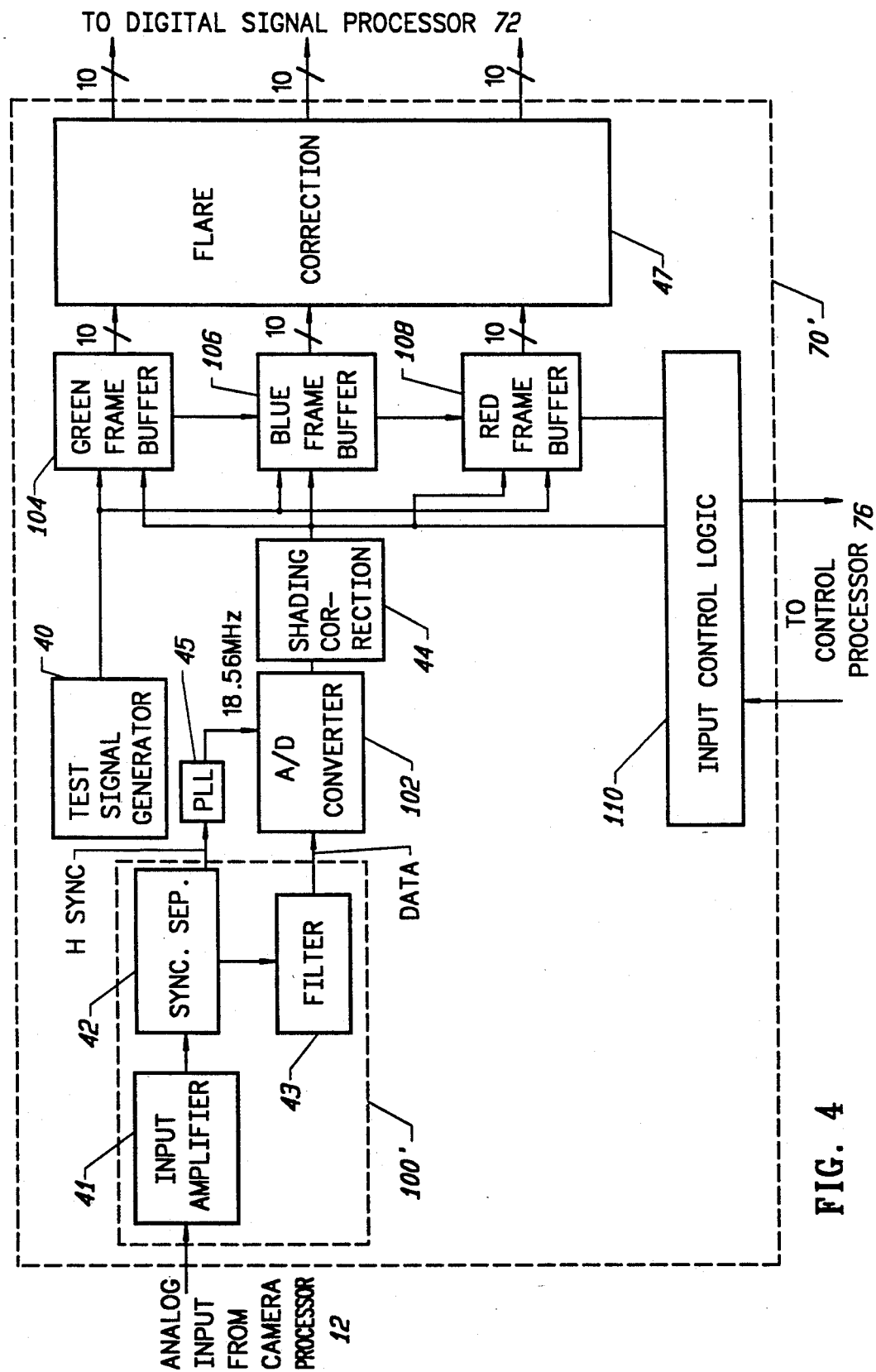
FIG. 4 is a block diagram of an alternative preferred embodiment of the input processor shown in FIG. 2.

In the embodiment of FIG. 4, input processor 70' includes means for performing shading correction on the digital output of A-to-D converter 102. The shading correction is performed (by circuit 44) before flare correction is performed (by circuit 47) on the data. In order to perform shading correction, a set of black and white shading correction signals must be generated. In contrast with flare correction signals which compensate for undesired luminance variation due to optical scatter from frame to frame within each color channel, the shading correction signals compensate for undesired luminance variation within each frame due to CCD pattern noise.

The black shading correction signals are preferably generated in the following manner. Camera processor 12 and input processor 70' (or input processor 70 of FIG. 2) are operated to generate red, green, and blue digital data collectively representing a "black" motion picture frame. This is conveniently accomplished by positioning a lens cap over the lens of the camera within unit 12, and then operating unit 12 to generate a red frame of data, a green frame of data, and a blue frame of data. The average luminance of each frame is then computed. Then, for each frame, the difference is computed between the luminance of each pixel of the frame, and the frame's average luminance. These difference signals (scaled by a pre-selected constant factor) are employed as "red," "green," and "blue" black shading correction signals (which are added to the corresponding red, green, and blue frames of data).

White shading correction is performed in a similar manner to black shading correction, except that the white shading correction signals generated are employed as multiplicative factor signals (rather than additive correction signals) to correct the red, green, and blue data streams.

In one class of embodiments, each of frame buffers 104, 106, and 108 includes two memory blocks, each having 1M×12 bit capacity. Each 1M×12 bit block includes three commercially available 1M×4 bit memory circuits. However, in a preferred embodiment within this class, only the ten most significant bits of the data are utilized (in the sense that each pixel read from any of buffers 104, 106, and 108, consists of ten parallel bits).

A preferred embodiment of an input processor which includes flare correction, shading correction, and lift variation correction circuitry will next be described with reference to FIG. 4. Input processor 70' of FIG. 4 is identical to input processor 70 of FIG. 3 except in the following respects. The analog input signal is supplied from camera processor 12 (preferably over a 75 ohm coax cable) to filter/amplifier circuit 100'. Circuit 100' includes input amplifier 41, sync separation circuit 42 for separating the horizontal sync, vertical sync, and video data portions of the input signal, and low pass filter 43 for filtering the video data portion of the input signal to enhance resolution during digitization. In one embodiment, the cutoff frequency of low pass filter 43 is about 7.5 MHz, with the filter having a flat frequency response from 0 to 7.5 MHz, and the frequency response of the filter declining in a steep slope from 7.5 MHz to 9.3 MHz.

The amplified, low-pass-filtered analog data stream output from filter 43 is digitized in analog-to-digital conversion circuit 102. In a preferred embodiment, the H Sync signal from sync separation circuit 42 is multiplied by 2200 in phase-locked loop 45 to generate an 18.56 MHz clock signal, and this 18.56 MHz clock signal is supplied to A-to-D conversion circuit 102, wherein it is employed to sample the input analog data at a data rate of 18.56 MHz.

In one operating mode, the digital video data generated by A-to-D converter 102 are supplied directly to green frame buffer 104, blue frame buffer 106, and red frame buffer 108 at the source rate (typically, 1.875 frames per second). Blue, green, and red data are read out in parallel from buffers 104, 106, and 108 (to produce three parallel data streams, each representing a different 10-bit color channel) at four times the source rate. In order to achieve the described four-fold increase in frame rate, each bit written into one of buffers 104, 106, and 108, is read out four times from that buffer.

In a normal operating mode, the digital data from A-to-D converter 102 are supplied to circuit 44 for shading correction and lift correction. The corrected red, green, and blue frames output from circuit 44 are written sequentially into frame buffers 104, 106, and 108. The data streams that are read out from frame buffers 104, 106, and 108 undergo flare correction in circuit 47.

In another operating mode of input processor 70', data from test signal generator 40 (rather than A-to-D converter 102 or correction circuit 44) are written sequentially into frame buffers 104, 106, and 108.

Figure 5:
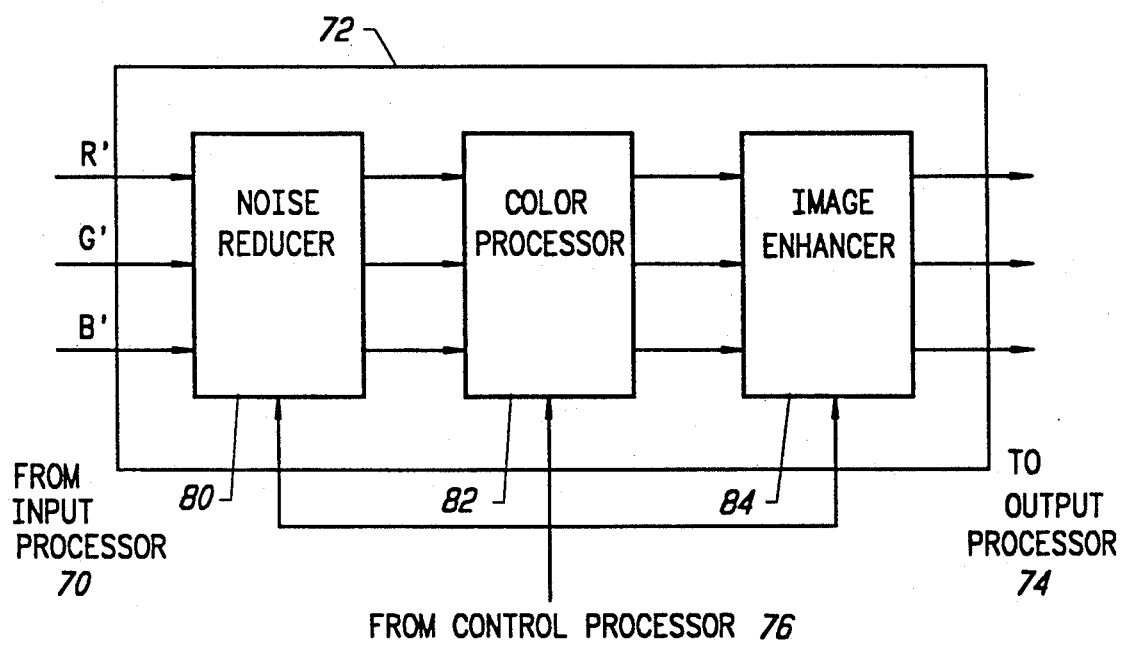
FIG. 5 is block diagram of the digital signal processor shown in FIG. 2.

With reference next to FIG. 5, digital signal processor 72 of FIG. 2 preferably includes a noise reduction circuit 80, which receives the data streams supplied from frame buffers 104, 106, and 108 of input processor 70 of FIG. 3 (or from flare correction circuit 47 of input processor 70' of FIG. 4) Noise reduction circuit 80 should include a circuit for reducing film noise (including film grain noise and scratches) and image pick-up system noise (including noise relating to the system's optics and image sensor, as well as associated electronic noise).

As indicated in FIG. 5, the output of noise reduction circuit 80 undergoes digital color correction in color processor 82, and then digital image enhancement in image enhancement circuit 84. Preferably, digital signal processor 72 processes the digital data at an internal processing rate substantially greater than the scanning rate of camera processor 12. For example, if the scanning rate is 1.875 fps, the internal processing rate of processor 72 may desirably be 7.5 fps.

Figure 6:
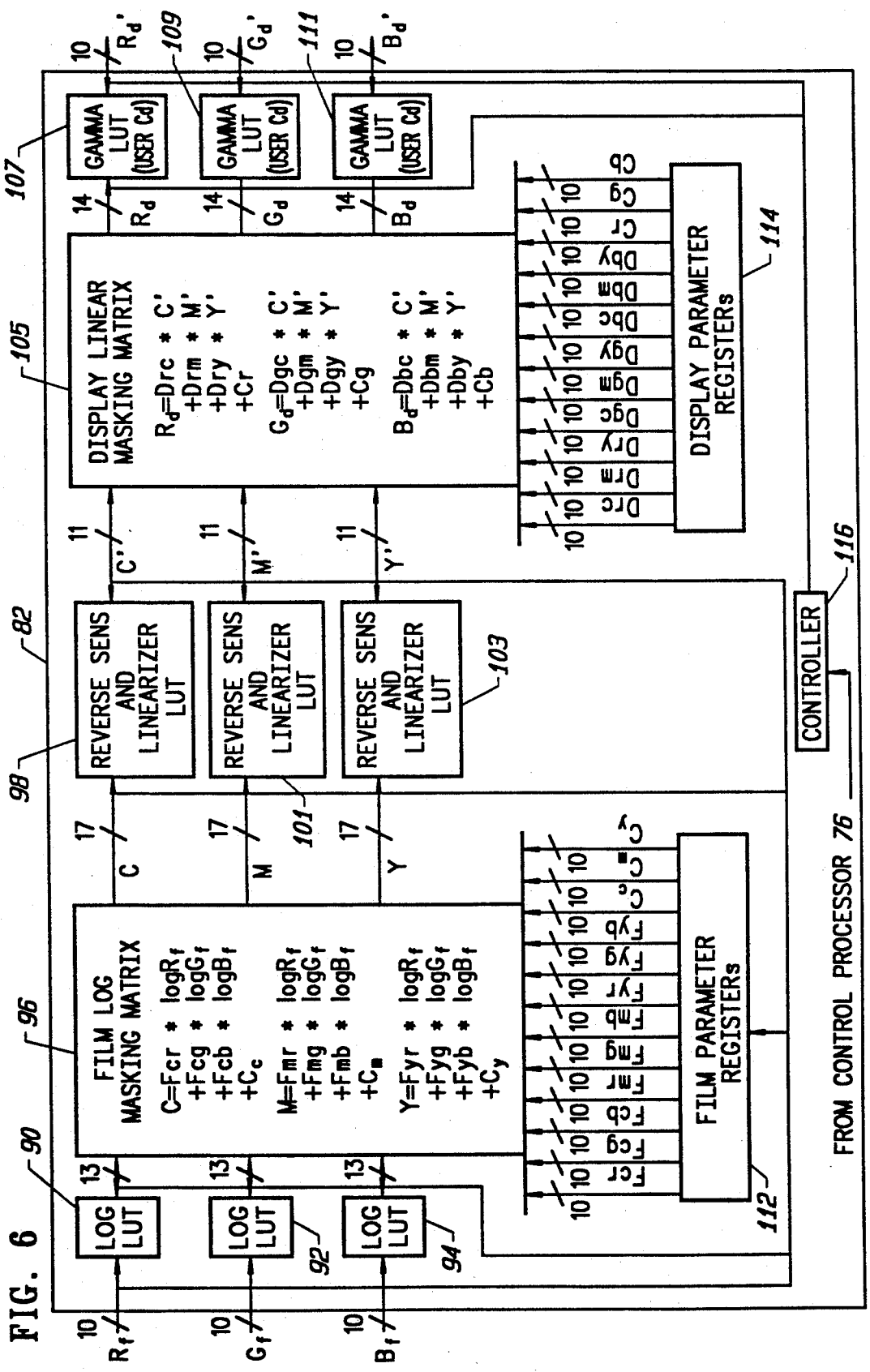
FIG. 6 is block diagram of the color processor shown in FIG. 5.

FIG. 6 is a preferred embodiment of color processor 82. The FIG. 6 apparatus is designed to perform a limited type of color transformation, namely the transformation of the colors of the digitized images generated by camera processor 14 (as a result of scanning motion picture film) into colors that would have been generated if the subject had been imaged directly by a video camera (i.e., without intermediate filming and film scanning steps). If desired, a more complicated and versatile color correction means, for example a "paint" system having the capability to perform a wide range of color transformations, may be substituted for the apparatus of FIG. 6.

The FIG. 6 apparatus includes a film transform section and a display transform section. The film transform section includes logarithm look-up tables 90, 92, and 94, masking matrix 96, parameter registers 112, and "reverse sensitometry and linearizing" look-up tables 98, 101, and 103. Display transform section includes masking matrix 105, parameter registers 114, and gamma function multiplication means 107, 109, and 111.

A logarithm operator is applied to each of the red, green, and blue 10-bit input pixels in look-up tables 90, 92, and 94, to generate a 13-bit value for each 10-bit input pixel. More particularly, logarithm look-up tables 90, 92, and 94 compute the logarithms of the red, green, and blue input pixels, by multiplying them by pre-stored log transformation parameters to generate 13-bit log domain output data.

Masking matrix 96 transforms the log domain data asserted at the outputs of look-up tables 90, 92, and 94 to correct for crosstalk between film dyes, interlayer interimage effects, and the effects of colored coupler masking as seen by camera processor 14. Masking matrix coefficients $F_{cr}$, $F_{cg}$, $F_{cb}$, $F_{mr}$, $F_{mg}$, $F_{mb}$, $F_{yr}$, $F_{yg}$, and $F_{yb}$, and parameters $C_{cr}$, $C_m$, and $C_y$, are determined by the spectral absorption of the film dyes and the spectral sensitivity of camera processor 14's image pickup system, and are stored in registers 112 in response to control signals supplied from controller 116 (in response to control signals from control processor 76). The data pixels asserted at the outputs of masking matrix 96 are proportional to equivalent cyan, magenta, and yellow film densities, and hence are grouped into the channels labeled "C", "M", and "Y".

The equivalent dye densities are related in a well-known manner to selective film exposures by sensitometric and characteristic curves. For this reason, the "cyan" data generated in masking matrix 96 undergoes gamma correction and reverse sensitometry processing, as well as inverse-log transformation in look-up table 98. Similarly, the "magenta" data generated in masking matrix 96 undergoes gamma correction, reverse sensitometry, and inverse-log transformation in look-up table 101, and the "yellow" data generated in masking matrix 96 undergoes gamma correction, reverse sensitometry, and inverse-log transformation in look-up table 103.

Display section linear masking matrix 105 next transforms the linear domain data asserted at the outputs of look-up tables 98, 101, and 103 to compensate for the overall non-ideal spectral characteristics of the system as a whole (including the motion picture film being scanned, camera processor 14, and monitor 38). The masking matrix coefficients $D_{rc}$, $D_{rm}$, $D_{ry}$, $D_{gc}$, $D_{gm}$, $D_{gy}$, $D_{bc}$, $D_{bm}$, and $D_{by}$, and parameters $C_r$, $C_g$, and $C_b$, that are employed to process the CMY data pixels in display linear masking matrix 105 are stored in parameter registers 114.

Masking matrix coefficients $D_{rc}$, $D_{rm}$, $D_{ry}$, $D_{gc}$, $D_{gm}$, $D_{gy}$, $D_{bc}$, $D_{bm}$, $D_{by}$, $F_{cr}$, $F_{cg}$, $F_{cb}$, $F_{mr}$, $F_{mg}$, $F_{mb}$, $F_{yr}$, $F_{yg}$, and $F_{yb}$, and parameters $C_r$, $C_g$, $C_b$, $C_c$, $C_m$, and $C_y$ are preferably selected by the user in the following manner. A test frame, from a sample of motion picture film of the same type as the film to be color-corrected, is scanned. Output processor 74 generates a composite video signal (in a manner to be explained in greater detail below) by combining portions of the test frame and a comparable reference frame. Monitor 38 displays the composite signal as a split screen image (with complementary portions of the test frame and the reference frame in distinct regions of the split screen). To generate the composite signal, control processor 76 reads out the reference frame from one of frame stores 120–127 under the control of computer 18.

While viewing the test frame and the reference frame, the user selects the processing coefficients and parameters interactively (by entering commands to input device 28 in response to menus displayed on computer graphics monitor 22) to achieve a desired visual appearance of the two displayed images.

In a variation on this procedure, the user selects a set of processing coefficients and parameters for each of a number of selected motion picture film frames (preferably using different corresponding pre-stored reference frames for each selected motion picture film frame), and computer 18 downloads each selected set of coefficients and parameters through control processor 76 and controller 116 at appropriate times to registers 112 and 114. Computer 18 also automatically generates coefficients and parameters for intermediate film frames (i.e., film frames for which the user did not specifically select coefficients and parameters) by employing an interpolation technique, and downloads these interpolated coefficients and parameters (at appropriate times) to registers 112 and 114.

After the data pixels asserted at the outputs of look-up tables 98, 101, and 103, are processed in display linear masking matrix 105, they are proportional to red, green, blue HDVS high definition video pixels and hence are grouped into the channels labeled "$R_d$", "$G_d$", and "$B_d$". Each of the $R_d$, $G_d$,' and $B_d$ data streams is processed in a corresponding one of gamma function multiplication circuits 107, 109, and 111, to compensate for the nonlinear characteristics of the display monitor. In one class of embodiments, each of multiplication circuits 107, 109, and 111 is implemented as a single look-up table comprising a read-only memory which stores a set of transform parameters to be applied to all input pixels in the relevant RGB channel.

However, an implementation employing a single look-up table for each RGB channel may undesirably introduce aliased data components into the data which cannot practically be subsequently removed.

Accordingly, we prefer to implement each of multiplication circuits 107, 109, and 111 as a set of N parallel look-up tables (each for applying a different term of an N-degree polynomial to the data) with a low-pass filter for pre-filtering the input data supplied to each look-up table. In this preferred embodiment, the data supplied to each lookup table are pre-filtered in the corresponding filter to eliminate high frequency components of the data which would otherwise introduce aliased signal components into the output of the look-up table. Within each color channel, each low-band-pass filter preferably passes a different frequency band, with the cut-off frequencies for the filters corresponding to higher-order polynomial terms exceeding the cutoff frequencies for the filters for lower-order polynomial terms.

The output of color processor 82 preferably undergoes image enhancement in image enhancement circuit 84 (shown in FIG. 5) prior to subsequent processing in output processor 74. Image enhancement means 84 preferably performs both edge enhancement and softening. In alternative versions of digital signal processor 72 shown in FIG. 5, noise reduction means 80 or image enhancement means 84 (or both means 80 and means 84) are omitted.

Figure 7:
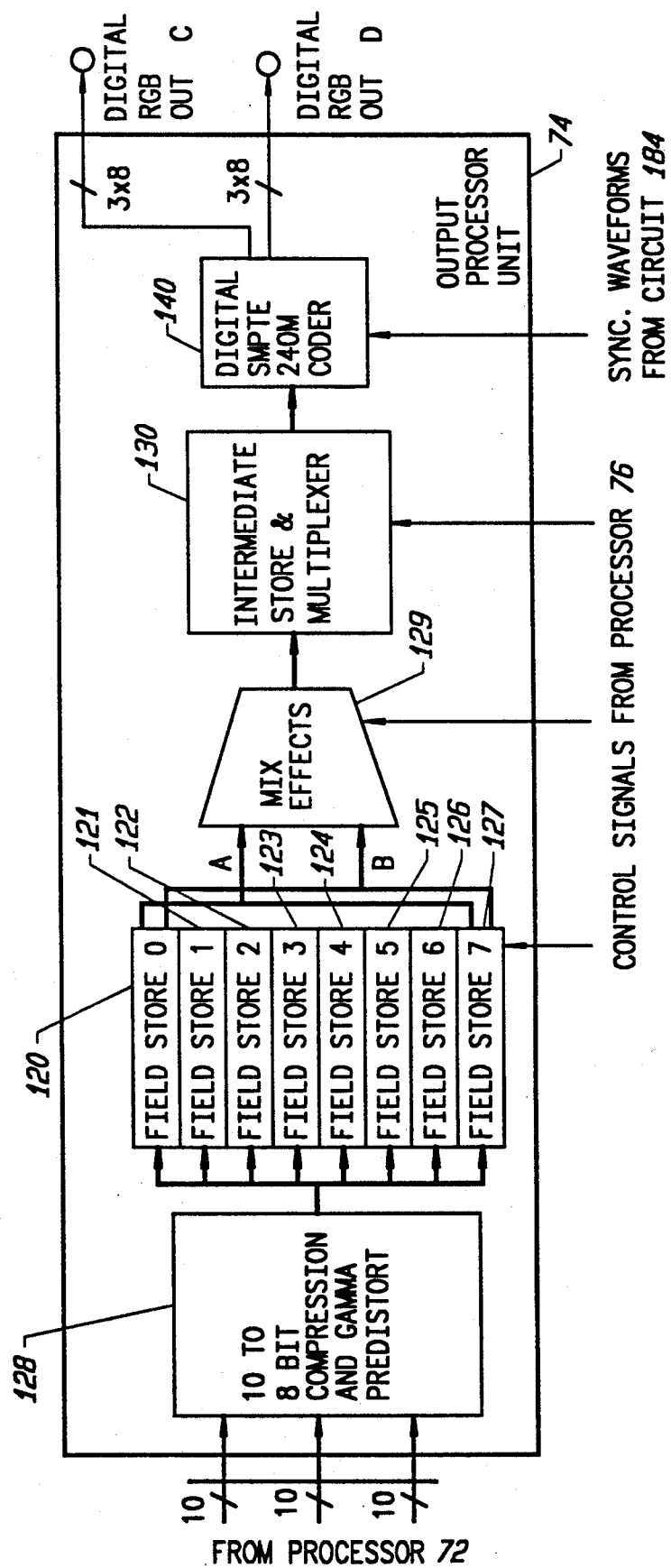
FIG. 7 is block diagram of the output processor shown in FIG. 2.

The preferred embodiment of output processor 74 shown in FIG. 7 includes compression circuit 128, which receives digitized frames of 10-bit parallel data from digital signal processor 72, and compresses the 10-bit parallel data stream into an 8-bit parallel data stream. The 8-bit data stream is written into a selected sequence of assembly field stores 120-127 in response to control signals supplied from control processor 76 to the field stores 120-127 (only one of field stores 120-127 receives data at a time). One or more digitized reference fields (typically, two reference fields which comprising a reference frame) are also stored in selected ones of field stores 120-127.

Five of field stores 120-127 are required to perform the 3-2 pulldown scanning process to be described below. Typically, two of field stores 120-127 are employed to store reference fields which comprise a reference frame.

Compression circuit 128 optionally also includes circuitry for performing display gamma predistortion on the 8-bit parallel data before the data are written into field stores 120-127.

As indicated in FIG. 7, data may be read from any two of field stores 120-127 in parallel, to produce two 8-bit parallel digital data streams A and B (for each color channel). In one typical case, data stream A represents a color-corrected motion picture film frame from digital signal processor 72, and data stream B represents a reference video frame pre-stored in the field stores.

Data are written into (and read out from) field stores 120-127 in response to control signals from processor 76. In one embodiment, a 3-2 pulldown process is implemented to write data from the field stores. Such a 3-2 pulldown process typically contemplates that camera processor 12 scans a motion picture film at a frame rate of (24/N) fps, where N is an integer, as the film advances through scanner 10 at the same rate (24/N fps). In one embodiment, N=16, so that camera processor 12 generates video frames at a rate of 1.5 frames per second. In this embodiment, digital data are read from input processor frame stores 104, 106, and 108 at the rate of 6 frames per second (12 fields per second), and written into field stores 120-127 at the same rate (12 fields per second).

Circuit 128 includes means for demultiplexing each frame of data it receives into its constituent odd $f_o$ and even $f_E$ fields, so that individual even or odd fields can be selectively written into fields stores 120-127. In general, to implement the 3-2 pulldown process, individual fields are written sequentially into field stores 120-127, and different sequences of fields (including some duplicate odd $f_{OD}$ and even $f_{ED}$ fields) are read from the field stores (at a higher field rate) to produce frames of output video data. Each frame of output video data includes one odd $f_O$ and one even $f_E$ field. In one embodiment, fields are written into field stores 120-127 at the rate of 12 fields per second, and are read out from fields stores 120-127 at the rate of 15 fields per second.

For example, in response to control signals from processor 76, fields can be written from circuit 128 into selected ones of field stores 120-127 in the following sequence: during a first timing cycle, fields $F_1f_O$ and $F_1f_E$ of the first input frame $F_1$, are written into field stores 120 and 121, respectively. During the next timing cycle, the two fields comprising the second input frame $F_2$ are written into field stores 122 and 123, respectively. Similarly, during subsequent timing cycles, subsequent input frames $F_N$ are written into selected pairs of field stores 120-124, or reference fields are written into field stores 125-126.

During the first output timing cycle, fields $F_1f_O$ and $F_1f_E$ corresponding to the first input frame $F_1$ are read from field stores 120 and 121. During the second output timing cycle, the odd field from the first input frame is output again as a duplicate field $F_1f_{OD}$, along with the even field $F_2f_E$ of the second input frame $F_2$. Subsequent fields are similarly output (for example, in the sequence described in detail in the above-referenced patent application entitled "Film-to-Video Frame Image Conversion Apparatus and Method for Selectively Identifying Video Fields and Frames," by P. Capitant, D. Hodgson and V. Perry, filed May 14, 1991 (Ser. No. 07/699,928).

Rate conversion (for example, from the rate of 12 fields per second to the rate of 15 fields per second) is thus achieved by reading out stored fields repeatedly from selected ones of stores 120–127. In one embodiment, data are read from field stores 120–127 at a rate of 60 fields per second (30 fps), and processed in circuit 129, written into circuit 130, and read out from circuit 130 at that rate (30 fps). In another embodiment, data are read from field stores 120–127 at a rate of 15 fields per second (7.5 fps) processed in circuit 129 and written into circuit 130 at the rate of 7.5 fps, but read out from circuit 130 at the rate of 30 fps.

The digital video data stream asserted at the output of circuit 129 includes "artificial" frames comprising even and odd fields from different input frames) Such artificial frames may interfere with subsequent processing of each digital video signal output from processor 74.

Digital data streams A and B from field stores 120–127 are supplied to the two inputs of "mixing and effects" circuit 129 (to be described in greater detail below with reference to FIG. 10). The mix source of circuit 129 (i.e., the factor signal K to be discussed below) may be a constant value for each frame of data read from store 200 or 202, in order to achieve a "fade" between sources A and B.

Circuit 129 preferably has an onboard wipe generation circuit which is capable of generating a time-varying factor signal K. Signal is time-varying in the sense that it has at least one leading or trailing edge during each period when a single field of data is read from store 200 or 202. Circuit 129 also includes circuitry for generating a composite signal from data streams A and B under control of the factor signal K. The composite signal is converted by circuit 140 into a composite video signal by insertion of sync information therein, and is then displayed by a video monitor as a split screen image in which a portion of the "A" image, and a complementary portion of the "B" image, occupy distinct regions of the monitor screen. The wipe generator within circuit 129 is preferably capable of generating rectangular wipes of any size within the output raster, and preferably can be switched on or off at any time in response to control signals from processor 76.

Circuit 129 also includes circuitry (to be described below in greater detail with reference to FIG. 10) for inserting a border signal into the data stream in order to produce a distinctive displayed border which separates the two image regions of the displayed composite signal. Such a distinctive border helps the system user to distinguish a reference image from a test image, since often the test image differs only slightly and subtly from the reference image.

Circuit 129 also includes circuitry for inserting a conventional graphics cursor signal into the composite digital signal asserted at the output of circuit 214 (to be described below with reference to FIG. 10). The cursor signal overlays a cursor region of the displayed video output from output processor 74. By operating the input device 28 to change the cursor signal, the user controls the position of the cursor in the displayed video image. In a preferred embodiment, when the displayed cursor highlights a region of a displayed video frame, the user can select color coefficients and parameters to match the highlighted region by entering appropriate commands using the input device 28.

The 8-bit parallel data streams (one 8-bit parallel stream for each of the R,G,B color channels) asserted at the output of circuit 129 is supplied to intermediate frame store circuit 130. The digital data from circuit 129 are written into circuit 130 at a first rate (typically 15 fields per second, which is 7.5 frames per second) and are read out from circuit 130 at four times the first rate (typically, 60 fields per second or 30 frames per second, the proposed standard SMPTE-240M digital video frame rate) Each bit written into circuit 130 is thus read out four times from circuit 130.

Within coding circuit 140, video synchronization signal insertion circuitry inserts digital blanking, sync, and vertical interval data into the horizontal and vertical blanking intervals of the digital data read out from circuit 130. The output of circuit 140 is thus a digital video signal ready for display. Preferably, the inserted sync information is standard high definition digital video sync information (for example, it may satisfy the proposed SMPTE-240M high definition digital video standard), so that the output of circuit 140 is a standard high definition digital color video signal. The sync information is supplied to circuit 140 from an internal timing generator 182 within timing unit 190, which is in turn within control processor 76 (to be described below).

Preferably, coder 140 also inserts encoded "tagging" information into the signal emerging from circuit 130. The tagging information can be a set of color correction or noise reduction parameters useful for performing subsequent color correction or noise reduction processing, or information which identifies artificial frames generated during the 3-2 pulldown process. Identification of the artificial frames in this manner enables subsequent processing systems (such as an EBR system which converts video signals to motion picture film images) to reject (or specially process) the artificial frames from the output of the FIG. 1 system.

The output of coder 140 is an 8-bit color digital video signal. Coder 140 asserts alternate frames of this digital video signal on output lines C and D, for storage, respectively, in frame stores 30 and 31 (shown in FIG. 1).

Figure 8:
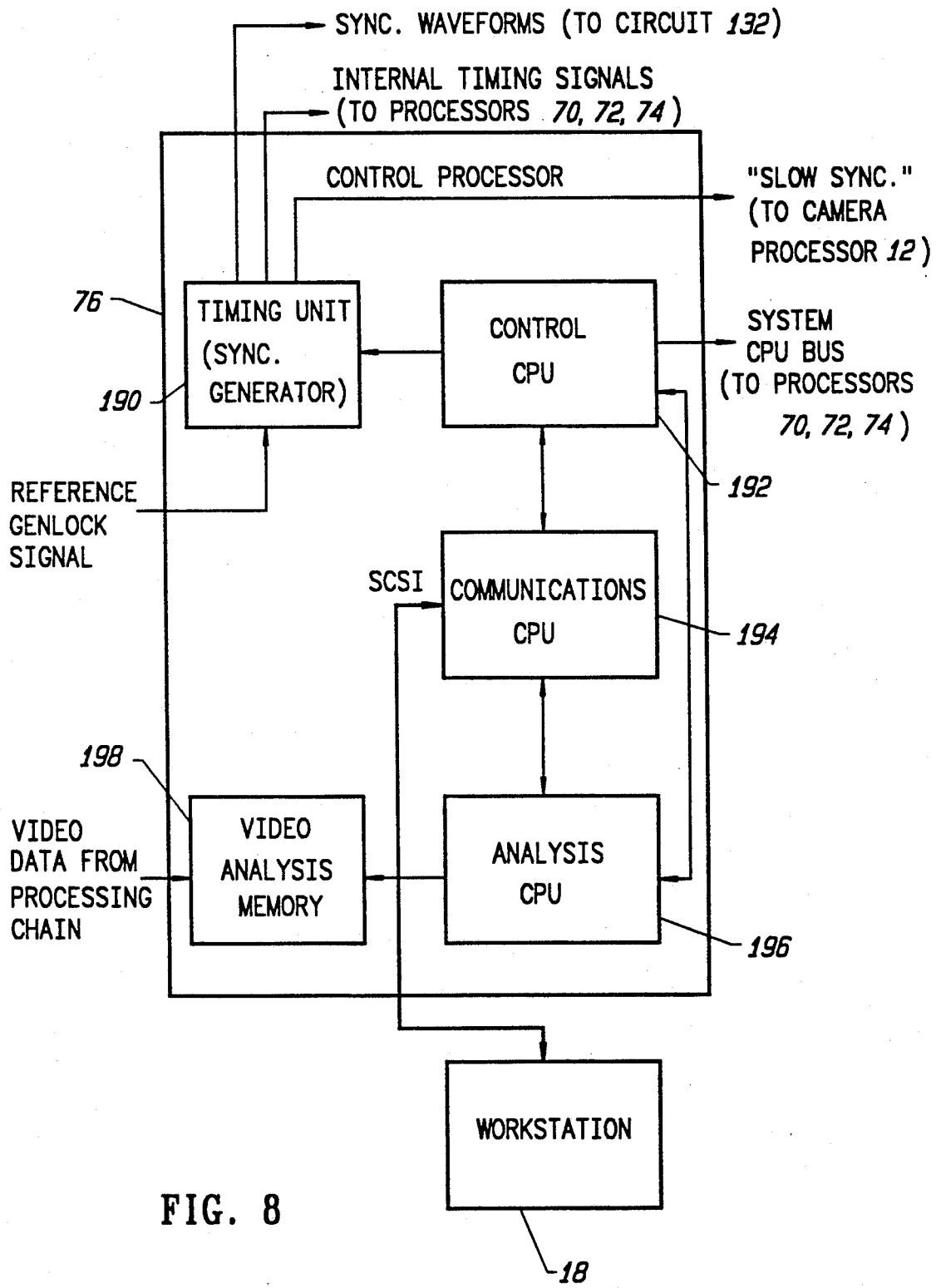
FIG. 8 is block diagram of the control processor shown in FIG. 2.

Control processor 76 of film scanning processor 14 will next be described with reference to FIG. 8. Communications CPU 194 within control processor 76 communicates with computer 18 over an SCSI interface.

The digital data being processed within film scanning processor 14 are supplied to video analysis memory 198. In response to instructions from CPU 194, a data analysis CPU 196 reads data from memory 198, analyzes the data, and sends the analysis results to CPU 194, which relays the results to computer 18.

In response to commands from CPU 194, control CPU 192 sends control signals to timing unit 190, and to the other processing boards within the film scanning processor 14 (input processor 70, digital signal processor 72, and output processor 74).

Figure 9:
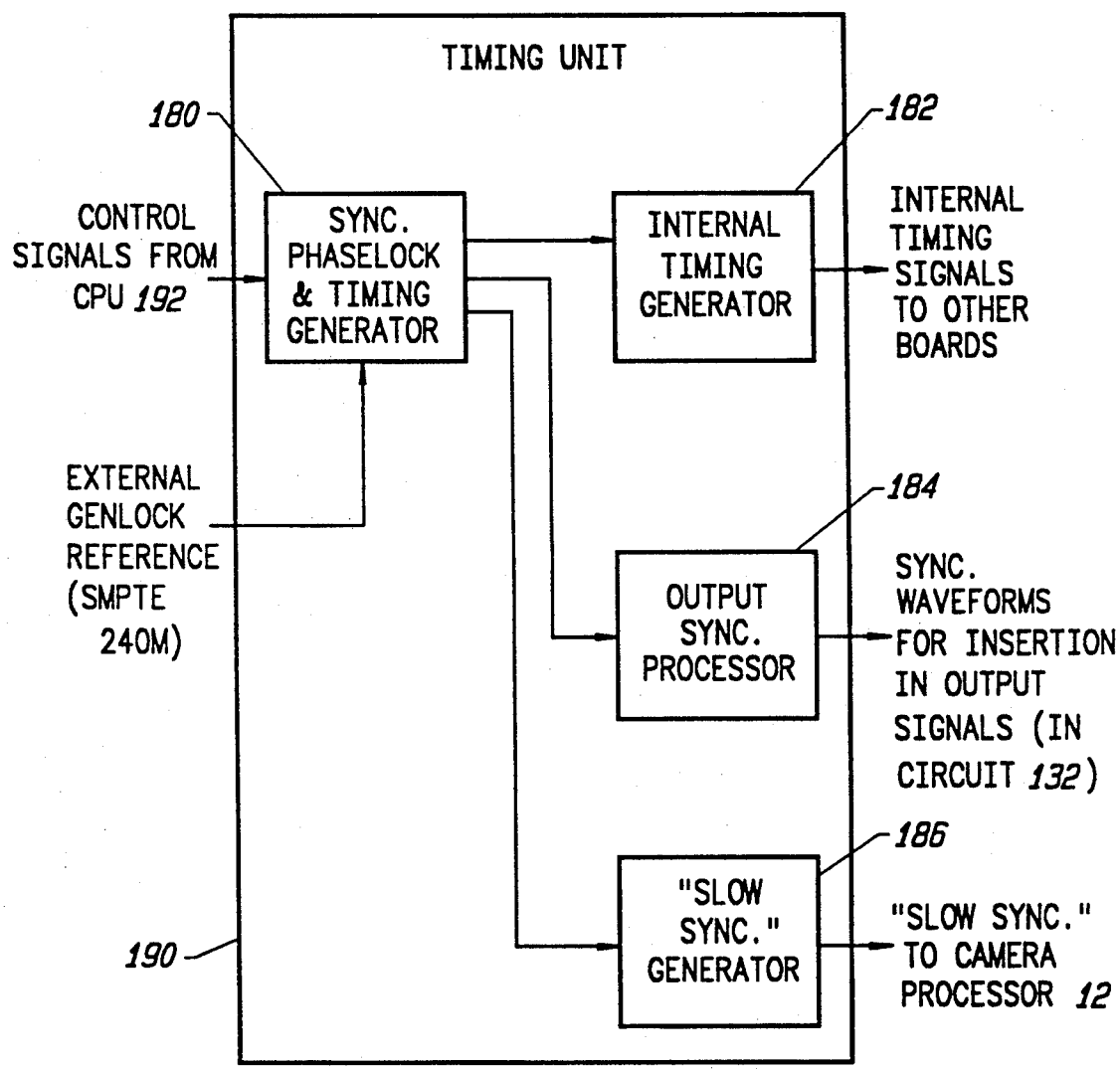
FIG. 9 is block diagram of the timing unit shown in FIG. 8.

With reference to FIG. 9, sync phaselock and timing generator 180 within timing unit 190 receives an external genlock reference signal (preferably an SMPTE-240M genlock reference signal), so that all signals supplied from circuit 180 to the other components of timing unit 190 are phaselocked to the external genlock reference. Slow sync generator 186 generates the above-mentioned low rate synchronization signal ("slow sync") for use by camera processor 12 in response to control signals from CPU 192. Output sync processor 184 generates synchronization waveforms for insertion in circuit 132 into the digital video data stream as described above, in response to control signals from CPU 192. Internal timing generator 182 generates other timing signals for use by processors 70, 72, and 74, in response to control signals from CPU 192.

A preferred embodiment of the inventive system will next be described with reference to FIG. 10. Although the FIG. 10 system is intended to be embodied in circuit 129 shown in FIG. 7, it may alternatively be embodied in other mixing circuits.

Figure 10:
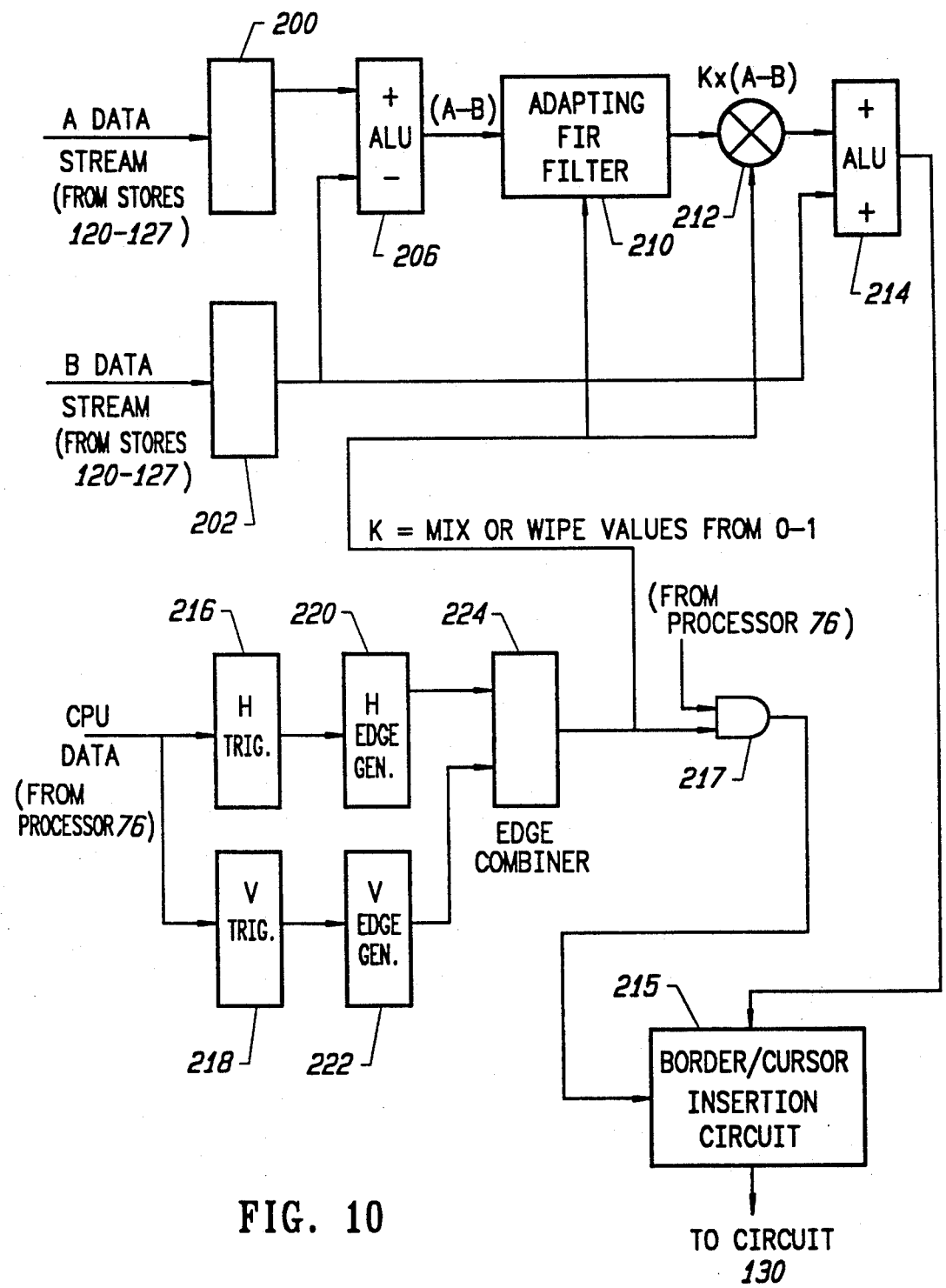
FIG. 10 is a block diagram of a preferred embodiment of a portion of the output processor of FIG. 7.

In FIG. 10, digital data streams A and B from field stores 120-127 are supplied to registers 200 and 202, respectively. The FIG. 10 circuit implements a mix/-wipe function by combining the input data streams A and B to generate an output signal $P=B+K(A-B)$, which is equivalent to the signal $KA+(1-K)B$. In these expressions, K represents a factor signal whose magnitude is selected in response to control signals from processor 76.

Input signal B is subtracted from input signal A in arithmetic logic circuit 206 to generate the difference signal $A-B$. The difference signal is filtered in adaptive finite impulse response filter 210 (to be explained below), and is multiplied by factor signal K in multiplication circuit 212. The output of circuit 212 is then added to the input signal B from register 202 in arithmetic logic unit 214, to produce the output signal $P=B+K(A-B)$.

To avoid introduction of aliasing error during multiplication in multiplication circuit 212, the difference signal $(A-B)$ is prefiltered in filter 210 before it is asserted at one of the two inputs of circuit 212. Adaptive filter 210 is transparent when signal K is a static signal (i.e., has a "d.c." or "constant" value). When signal K is dynamic (i.e., time varying, and typically comprising d.c. portions separated by edges) filter 210 low-pass filters the signal $(A-B)$ in the region of each dynamic K edge, so that the total bandwidth of the filtered signal emerging from filter 210 does not exceed the Nyquist value associated with multiplication circuit 212. In other words, the frequency of the highest frequency component of the filtered signal is less than half the sampling frequency of circuit 212.

To execute a dynamic wipe between field signals A and B being read from registers 200 and 202, a time varying (dynamic) factor signal K is supplied from edge combiner circuit 224 to filter 210 and multiplication circuit 212. To execute either a static or dynamic combination of signals A and B, the waveform of the dynamic signal K will have at least one edge for each frame (in the sense that at least one edge will occur while each field of data is read from store 200 or 202). To execute a dynamic wipe between signals A and B, the waveform of signal K will also vary from frame to frame (in the sense that its edges will occur at different times during the process of reading out each frame from store 200 or 202).

The factor signal K is generated in response to control signals supplied from processor 76 to horizontal triggering circuit 216 and vertical triggering circuit 218. The outputs of circuits 216 and 218 are supplied, respectively, to horizontal edge generation circuit 220 and vertical edge generation circuit 222. The outputs of circuits 220 and 222 are combined in circuit 224 to produce the signal K.

Any desired wipe transition between fields A and B (whether horizontal, vertical, diagonal, or some other combination of horizontal and vertical) can be implemented using the FIG. 10 circuit. Also using the FIG. 10 circuit, a variety of static combinations of data streams A and B can be implemented (by repeatedly supplying the same signal K to circuit 212 for each consecutive pair of fields A and B supplied to circuit 206), and a variety of fades between data streams A and B can be implemented (by supplying a different d.c. signal K to circuit 212 for each consecutive pair of fields A and B supplied to circuit 206).

The output of circuit 214 can be further processed by circuit 215 (to be described below) within circuit 129, and then supplied to circuit 130 (described above with reference to FIG. 7). Alternatively, the output of circuit 214 can be supplied directly to circuit 130.

In the case that dynamic signal X is a digital number, representing some value between zero and one, the composite signal emerging at the output of circuit 214 consists of "A" sequences (sequences of bits from data stream "A") concatenated with "B" sequences (sequences of bits from data stream "B"). At each interface between an "A" and a "B" sequence, it is possible to define a transitional set of bits (which may consist of bits from stream "A" or "B" or both streams "A" and "B").

Circuit 215 includes means for substituting a border signal in the composite signal from circuit 214 in place of each transitional set of bits, under control of factor signal K from circuit 224. Circuit 215 also includes means for inserting a cursor signal into the composite signal emerging from circuit 214, at locations determined by control signals supplied to circuit 215 from processor 76. The cursor signal can be a conventional graphics cursor signal. The control signals supplied to circuit 215 from processor 76 and circuit 224 are combined in OR gate 217.

Either or both of the border signal insertion means and the cursor signal insertion means within circuit 215 can be disabled in response to a control signal from processor 76. When the border signal insertion means within circuit 215 is enabled, a bordered composite signal is asserted at the output of circuit 215 and is routed to circuit 130 for conversion into a bordered composite video signal. When displayed, the bordered composite video signal has a distinctive border which separates "A" and "B" image regions. The border helps the system user to distinguish a reference image in one of the image regions from a test image in the other of the image regions.

Preferably, the user can select the color of the border by issuing an appropriate command to computer 18. In response to such a command, computer 18 will cause control processor 76 to generate appropriate control signals, and to send the control signals to circuit 215.

When the cursor signal insertion means within circuit 215 is enabled, a composite signal is asserted at the output of circuit 215 and is routed to circuit 130 for conversion into a composite video signal. When this composite video signal is displayed, a displayed cursor signal overlays a cursor region of the split screen composite image. By operating input device 28, the user can vary the control signal supplied from processor 76 to circuit 215, to control the position of the cursor in the displayed composite image.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A system for generating a bordered composite signal for use in comparing a digitized film image with a reference image, including:
   first storage means for storing a first digital signal representing the reference image;
   second storage means for storing a second digital signal representing the digitized film image;
   means connected to the first storage means and the second storage means, for combining selected portions of the first digital signal and the second digital signal to generate a composite signal, wherein the composite signal includes a first image portion consisting of portions of the first digital signal, a second image portion consisting of portions of the second digital signal, and a transition portion between the first image portion and the second image portion; and
   border signal insertion means for combining a border signal with the composite signal by replacing the transition portion with said border signal to generate a bordered composite signal.

2. The system of claim 1, also including:
   means for generating a bordered composite video signal from the bordered composite signal.

3. The system of claim 1, also including:
   means for displaying the bordered composite video signal as a bordered split screen image.

4. The system of claim 1, wherein the first image portion is a reference image portion, and the second image portion is a digitized image portion.

5. A system for generating a bordered composite signal for use in comparing a digitized film image with a reference image, including:
   a set of field store circuits;
   a means for reading a first digital signal representing the reference image and a second digital signal representing the digitized film image from the field store circuits;
   a first signal combination means for combining selected portions of the first digital signal and the second digital signal, under control of a factor signal, to generate a composite signal;
   an edge combiner means for generating the factor signal and supplying the factor signal to the first signal combination means; and
   border signal insertion means for combining a border signal with the composite signal to generate a bordered composite signal.

6. The system of claim 5, wherein the edge combiner means also includes means for supplying the factor signal to the border signal insertion means, and wherein the border signal insertion means replaces portions of the composite signal with the border signal under control of the factor signal.

7. The system of claim 6, also including:
   means for generating a bordered composite video signal from the bordered composite signal; and
   means for displaying the bordered composite video signal as a bordered split screen image.

8. The system of claim 7, also including:
   a cursor signal insertion means for combining a cursor signal with the bordered composite signal to generate a third composite signal.

9. The system of claim 8, also including:
   means for generating a bordered composite video signal from the third composite signal; and
   means for displaying the bordered composite video signal as a bordered split screen image with a cursor overlay.

10. A film scanning system, including:
    means for generating a digital signal representing digitized film images;
    means for digitally correcting the digital signal to generate a corrected digital signal;
    storage means for storing the corrected digital signal and a reference signal representing a reference image;
    signal combination means for reading the corrected digital signal and the reference signal from the storage means and combining selected portions of the corrected digital signal and the reference signal under control of a factor signal to generate a composite signal;
    edge combiner means for generating the factor signal and supplying the factor signal to the signal combination means; and
    border signal insertion means for combining a border signal with the composite signal to generate a bordered composite signal.

11. The system of claim 10, wherein the edge combiner means also includes a means for supplying the factor signal to the border signal insertion means, and wherein the border signal insertion means replaces portions of the composite signal with the border signal under control of the factor signal.

12. The system of claim 11, also including:
    means for generating a bordered composite video signal from the bordered composite signal; and
    means for displaying the bordered composite video signal as a bordered split screen image.

13. The system of claim 10, wherein the signal combination means includes:
    means for generating a difference signal by subtracting the reference signal from the corrected digital signal;
    a multiplication circuit for receiving the factor signal and the difference signal, and multiplying the factor signal and the difference signal to generate a third digital signal, and
    means for combining the reference signal with the third digital signal to generate the composite signal.

14. A method for producing a bordered composite signal, including the steps of:
    (a) combining selected portions of a first digital signal representing one or more film images, and a second digital signal representing one or more reference images, to generate a composite signal, wherein the composite signal includes first image portions consisting of portions of the first digital signal, second image portions consisting of portions of the second digital signal, and transition portions between the first image portions and the second image portions; and
    (b) combining a border signal with the composite signal by replacing the transition portions with said border signal to generate a bordered composite signal.

15. The method of claim 14, also including the step of:
(c) generating a bordered composite video signal from the bordered composite signal.

16. The method of claim 15, also including the steps of:
(d) displaying the bordered composite video signal as a bordered split screen image.

17. The method of claim 14, wherein the first image portions are reference image portions, and the second image portions are film image portions.

18. The method of claim 14, wherein step (a) includes the steps of:
generating a difference signal by subtracting the second digital signal from the first digital signal;
multiplying the difference signal by a factor signal to generate a third digital signal; and
combining the second digital signal with the third digital signal to generate the composite signal.

19. The method of claim 14, also including the step of:
combining a cursor signal with the bordered composite signal to generate a third composite signal.

20. The method of claim 19, also including the steps of:
generating a bordered composite video signal from the third composite signal; and
displaying the bordered composite video signal as a bordered split screen image having a cursor overlay.

* * * * *